United States Patent [19]
Ito et al.

[11] Patent Number: 5,846,162
[45] Date of Patent: Dec. 8, 1998

[54] CONTROL SYSTEM FOR INHIBITING AN AIMULTAREON ENGAGING/APPLYING OF TWO FRICTIONAL ELEMENTS IN A TANDEM TRANSMISSION

[75] Inventors: Hiroshi Ito; Hideki Yasue; Daisuke Inoue, all of Toyota; Hiromichi Kimura, Okazaki, all of Japan

[73] Assignee: Toyota Jidosha Kabushiki Kaisha, Toyota, Japan

[21] Appl. No.: 864,405

[22] Filed: May 28, 1997

[30]    Foreign Application Priority Data

May 29, 1996 [JP] Japan ................................ 8-157558

[51] Int. Cl.⁶ ........................... F16H 61/00; F16H 61/04
[52] U.S. Cl. ........................................ 477/143; 477/906
[58] Field of Search ................................. 477/127, 129, 477/143, 906, 115; 701/51, 62

[56]              References Cited

U.S. PATENT DOCUMENTS

| | | | |
|---|---|---|---|
| 4,789,937 | 12/1988 | Yasue et al. ............................... | 701/62 |
| 4,945,482 | 7/1990 | Nishikawa et al. ...................... | 701/51 X |
| 5,109,721 | 5/1992 | Boardman et al. ..................... | 477/906 X |
| 5,109,731 | 5/1992 | Iwatsuki et al. ......................... | 701/62 |
| 5,191,814 | 3/1993 | Ando et al. .............................. | 477/906 X |
| 5,665,027 | 9/1997 | Oba et al. ................................ | 477/906 X |

FOREIGN PATENT DOCUMENTS

| | | |
|---|---|---|
| 6-341531 | 12/1994 | Japan . |
| 6-341539 | 12/1994 | Japan . |
| 6-341540 | 12/1994 | Japan . |

*Primary Examiner*—Khoi Q. Ta
*Attorney, Agent, or Firm*—Oblon, Spivak, McClelland, Maier & Neustadt, P.C.

[57]            ABSTRACT

A control system for an automatic transmission which includes a first speed change unit for executing a predetermined speed change by applying/releasing two of a plurality of frictional engagement elements simultaneously and a second speed change unit capable of executing speed changes in at least two higher and lower stages are connected in tandem. The control system comprises: a speed change abnormality detector for detecting an abnormality in the speed change which is executed by applying/releasing the two frictional engagement elements of the first speed change unit simultaneously; and a first speed change unit speed change inhibitor for inhibiting the speed change, which is executed by applying/releasing the two frictional engagement elements in the first speed change unit, when the speed change abnormality is detected by the speed change abnormality detector.

7 Claims, 6 Drawing Sheets

FIG.8

| RANGE | TOTAL | | FIST SPEED CHANGE UNIT | | SECOND SPEED CHANGE UNIT | | SOLENOID VALVE | | | FIST SPEED CHANGE UNIT | | | | | SECOND SPEED CHANGE UNIT | | |
|---|---|---|---|---|---|---|---|---|---|---|---|---|---|---|---|---|---|
| | GEAR STAGE | GEAR RATIO | GEAR STAGE | GEAR RATIO | GEAR STAGE | GEAR RATIO | S1 | S2 | S3 | C1 | C2 | B1 | B2 | F1 | C3 | B3 | F2 |
| D | 1st | 4.2 | 1 | 3.0 | Lo | 1.4 | ○ | ○ | × | ○ | | | | ◎ | | ○ | ◎ |
| | 2nd | 2.1 | 2 | 1.5 | Lo | 1.4 | × | ○ | × | ○ | | ○ | | | | ○ | ◎ |
| | 3rd | 1.4 | 3 | 1.0 | Lo | 1.4 | ○ | × | × | ○ | ○ | | | | | ○ | ◎ |
| | 4th | 1.0 | 3 | 1.0 | Hi | 1.0 | ○ | × | ○ | ○ | ○ | | | | ○ | | |
| | 2.5th | 1.5 | 2 | 1.5 | Hi | 1.0 | × | ○ | ○ | ○ | | ○ | | | ○ | | |

CONTROL SYSTEM FOR INHIBITING AN AIMULTAREON ENGAGING/APPLYING OF TWO FRICTIONAL ELEMENTS IN A TANDEM TRANSMISSION

BACKGROUND OF THE INVENTION

1. Field of the Invention

The present invention relates to a system for controlling an automatic transmission of a vehicle and, more particularly, to a control system for an automatic transmission in which a first speed change unit capable of setting a rear stage and a plurality of forward stages and a second speed change unit capable of executing a speed change of at least two higher and lower stages are connected in tandem.

2. Related Art

As well known in the art, a control system for an automatic transmission is constructed to execute speed changes by applying or releasing frictional engagement elements such as clutches or brakes to change the power transmission line, i.e, the gear ratio. In order to reduce the shock by smoothing the change in the output torque at a shifting time, moreover, the inertial energy accompanying the rotational change at the shifting time is absorbed through the slips of the frictional engagement elements. Thus, the shift shock is seriously influenced by the manner how to apply or release the frictional engagement element to participate in the speed change, so that the durability of the frictional engagement elements is determined by the manner.

In the prior art, there has been generally adopted an automatic transmission which is constructed to execute speed changes of low shifting shock easily by using a one-way clutch to be automatically applied/released depending upon the manner to apply the torque so that the one-way clutch may be applied/released as multi-disc clutches and/or multi-disc brakes are applied/released. However, the direction of inputting the torque to the automatic transmission is inverted between the drive state and the driven state so that the one-way clutch to be applied in the drive state is released in the driven state. When the one-way clutch is used, therefore, the multi-disc clutches and/or the multi-disc brakes have to be arranged in parallel with the one-way clutch, and this arrangement raises a problem that it is improper for reducing the size and weight of the automatic transmission.

In order to solve this problem, there has been developed an automatic transmission which is constructed to set its gear stages exclusively by multi-disc type frictional engagement elements while eliminating the one-way clutch for setting a predetermined lower stage. This is exemplified by an automatic transmission, as disclosed in JP-A-6-341531, in which the one-way clutch is eliminated to cause the so-called "clutch-to-clutch shift" to be effected by switching the applied/released states of the two frictional engagement elements at the time of a predetermined speed change. In this clutch-to-clutch shift, depending upon the propriety of the timings for applying/releasing the frictional engagement elements participating in the speed changes, the overshoot of the engine and/or the shock due to the tie-up is caused to make it necessary to control the timings or oil pressures accurately for applying/releasing the individual frictional engagement elements. As a matter of fact, however, the oil pressures may not be accurately controlled when the oil temperature is so low that the flow resistance is high due to the oil viscosity or when the actions of the valves for controlling the oil pressures are troubled. In the invention disclosed in the aforementioned publication, therefore, the speed change is inhibited when the clutch-to-clutch shift cannot be properly executed.

The clutch-to-clutch shift is caused when the one-way clutch is not used as the means for setting a predetermined gear stage at a lower speed, and its gear stage is generally at an intermediate one at a lower speed side such as a second speed or a third speed. When the gear stage for the clutch-to-clutch shift is inhibited due to some abnormality and is not set, in the aforementioned prior art automatic transmission, the intermediate gear stage is eliminated. As a result, the speed change has to be executed between the gear stages of a large difference of gear ratios.

At the time of a speed change between the gear stages of the large gear ratio difference, the change in the number of revolutions or RPM accompanying the speed change is so high that the amount of energy to be absorbed in the frictional engagement elements may possibly be increased to lower the durabilities of the frictional engagement elements. Because of the large gear ratio difference, moreover, the drive forces before and after the speed change are so different that they may not possibly be appropriate for the running state thereby to fail to effect the smooth run and to deteriorate the shift shock.

In order to avoid these disadvantages, it is also possible to make such a control that a speed change to a higher speed side than the intermediate stage at a lower speed side for the clutch-to-clutch shift is not made. When the speed change to the higher gear stage than that intermediate one is inhibited, however, the vehicle has to run at a high speed at the lower gear stage thereby to cause problems of the drop in the durability and the deterioration in the running feel by the high speed rotation.

SUMMARY OF THE INVENTION

A main object of the present invention is to provide a control system which can control a first speed change unit and a second speed change unit constructing an automatic transmission, in accordance with the situation of the automatic transmission thereby to keep the running performance satisfactory at all times.

According to a first aspect of the present invention, there is provided a control system for an automatic transmission which includes a plurality of frictional engagement elements and in which a first speed change unit for executing a predetermined speed change by applying/releasing two of the frictional engagement elements simultaneously and a second speed change unit capable of executing speed changes in at least two higher and lower stages are connected in tandem. This control system comprises: speed change abnormality detecting means for detecting an abnormality in the speed change which is executed by applying/releasing the two frictional engagement elements of the first speed change unit simultaneously; and first speed change unit speed change inhibiting means for inhibiting the speed change, which is executed by applying/releasing the two frictional engagement elements in the first speed change unit, when the speed change abnormality is detected by the speed change abnormality detecting means.

According to this control system, therefore, when the predetermined speed change, as required to control the timings accurately for applying/releasing the two frictional engagement elements is abnormal, that is, when it is detected that the timings for applying/releasing those frictional engagement elements cannot be controlled, the speed change at the first speed change unit is inhibited. In this case, not the speed change at the second speed change unit but the intrinsically uncontrollable speed change is inhibited to prevent the deterioration of the shift shock, and the shift by the second speed change unit in place of the former speed change can be made to retain the running performance at an abnormal time.

In addition to the aforementioned construction, the control system of the present invention further comprises: clutch-to-clutch shift deciding means for deciding that the shift is to be executed by applying/releasing the two frictional engagement elements in the first speed change unit; and speed change instructing means for executing a speed change other than that, which is decided by the clutch-to-clutch shift deciding means, when the speed change abnormality detecting means detects the speed change abnormality.

According to this control system, therefore, another speed change other than the abnormal one is instructed by the speed change instructing means so that the running performance can be retained.

In addition to the aforementioned construction, the control system of the present invention further comprises notification means for notifying an inhibition of a predetermined speed change in the first speed change unit when the predetermined speed change is inhibited by the first speed change unit speed change inhibiting means.

According to the control system, therefore, even when the running performance at the abnormal time is retained while allowing the smooth speed change, the driver can be notified of the abnormality to prevent the run in the abnormal state in advance from being continued.

According to another aspect of the present invention, there is provided a control system for an automatic transmission which includes a plurality of frictional engagement elements and in which a first speed change unit for executing a predetermined speed change by switching the applied/released states of the frictional engagement elements and a second speed change unit capable of executing speed changes in at least two higher and lower stages are connected in tandem. The control system comprises: speed change inhibiting means for inhibiting the predetermined speed change to be executed by switching the applied/released states of the frictional engagement elements in the first speed change unit; and alternative speed change instructing means for executing such a speed change by the second speed change unit as has the same gear ratio changing tendency as that to a predetermined speed change when the predetermined speed change in the first speed change unit is inhibited by the speed change inhibiting means.

According to this control system, therefore, even when the predetermined speed change at the first speed change unit cannot be executed by a failure or the like, a speed change approximate to the predetermined one can be achieved by the speed change at the second speed change unit so that the running performance at the abnormal time can be retained.

The above and further objects and novel features of the present invention will more fully appear from the following detailed description when the same is read with reference to the accompanying drawings. It is to be expressly understood, however, that the drawings are for the purpose of illustration only and are not intended as a definition of the limits of the invention.

BRIEF DESCRIPTION OF THE DRAWINGS

FIG. 8 is a clutch/brake application chart showing the active states of frictional engagement elements and solenoid valves for setting the individual forward stages in a D-range.

DESCRIPTION OF THE PREFERRED EMBODIMENT

Figure 3:
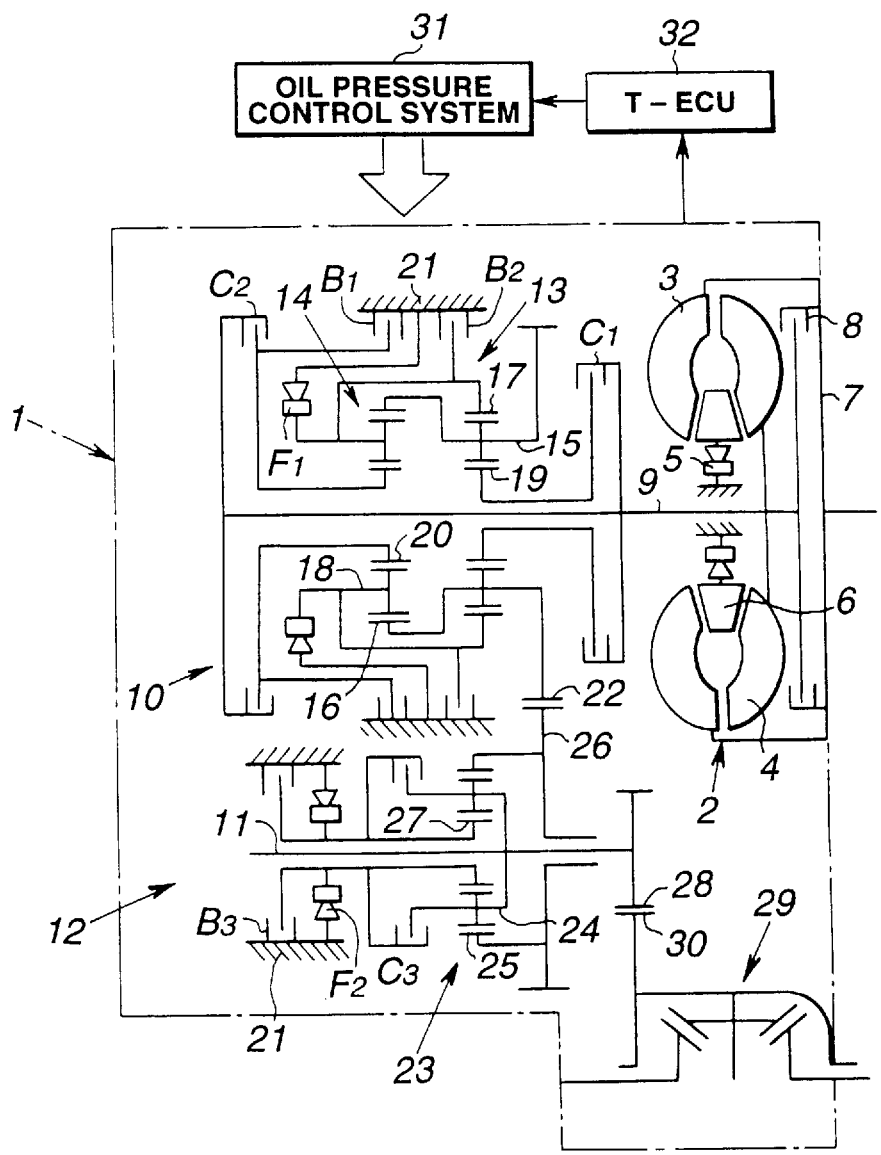
FIG. 3 is a conceptional diagram showing one example of a gear train of an automatic transmission, to which is applied the present invention, and an entire control line.

The present invention will be more specifically described with reference to the accompanying drawings. First of all, here will be described one example of an automatic transmission to which is applied the present invention. An automatic transmission 1, as shown in FIG. 3 is of the so-called "transverse type automatic transmission", as arranged transversely of a vehicle and is connected to the (not-shown) engine through a torque converter 2. This torque converter 2 is similar to one generally used in the prior art, and a turbine runner 4 is arranged to face a pump impeller 3 which is rotationally driven by the torque coming from the engine. Moreover, a stator 6, as retained by a one-way clutch 5, is arranged between those pump impeller 3 and turbine runner 4, and a lockup clutch 8 is interposed between a front cover 7, as integrated with the pump impeller 3, and the turbine runner 4. In alignment with the torque converter 2, there is arranged an input shaft 9, which is connected to the turbine runner 4.

A first speed change unit 10 is aligned with the input shaft 9, and a second speed change unit 12 is aligned with a counter shaft 11 which is arranged in parallel with the input shaft 9. The first speed change unit 10 is composed mainly of a first planetary gear mechanism 13 and a second planetary gear mechanism 14 individually of the single pinion type. These planetary gear mechanisms 13 and 14 are so arranged adjacent to each other that the carrier 15 of the first planetary gear mechanism 13, as located at the righthand side of FIG. 3 and the ring gear 16 of the second planetary gear mechanism 14, as located at the lefthand side of FIG. 3 are connected to rotate together, and that the ring gear 17 of the first planetary gear mechanism 13 and the carrier 18 of the second planetary gear mechanism 14 are connected to rotate together.

There is provided a first clutch C1 for transmitting the torque of the input shaft 9 selectively to the sun gear 19 of the first planetary gear mechanism 13. The first clutch C1 is arranged between the torque converter 2 and the first planetary gear mechanism 13. There is further provided a second clutch C2 for transmitting the torque of the input shaft 9 selectively to the sun gear 20 of the second planetary gear mechanism 14. The second clutch C2 is arranged at the opposite side (as located at the lefthand end portion of FIG. 3) of the first clutch C1 across the individual planetary gear mechanisms 13 and 14.

As brake means, on the other hand, there are provided a first brake B1 for stopping the rotation of the sun gear 20 of the second planetary gear mechanism 14 selectively and a second brake B2 for stopping the rotations of the ring gear 17 and the carrier 18, as integrated with each other, selectively. These brakes B1 and B2 are exemplified by the multi-disc type or the band type, and the first brake B1 is arranged between the sun gear 20 and a casing 21 where the second brake B2 is arranged between the ring gear 17 or the carrier 18 and the casing 21. In parallel with the second brake B2, moreover, there is arranged a first one-way clutch F1. This first one-way clutch F1 is applied, when the integrated ring gear 17 and carrier 18 are to rotate in the opposite direction of the input shaft 9, to stop their rotations.

With the carrier 15 in the first planetary gear mechanism 13, there is integrated a counter drive gear 22, which is arranged between the first planetary gear mechanism 13 and the first clutch C1.

The individual clutches C1 and C2, brakes B1 and B2 and one-way clutch F1 thus far described are the frictional engagement elements of the present invention, which are properly applied/released to set one reverse gear stage and a plurality of forward gear stages in the first speed change unit 10.

Here will be described the second speed change unit 12. This second speed change unit 12 is composed mainly of a third planetary gear mechanism 23 of the single pinion type. In this third planetary gear mechanism 23, a carrier 24 is connected to rotate together with the counter shaft 11, and a ring gear 25 is integrated with a counter driven gear 26 which is arranged rotatably in alignment with the counter shaft 11. Incidentally, the counter driven gear 26 is in meshing engagement with the counter drive gear 22.

There is further provided a third clutch C3 for connecting the carrier 24 and the sun gear 27 of the third planetary gear mechanism 23 selectively. Between the sun gear 27 and the casing 21, moreover, there are arranged in parallel a third brake B3 of the multi-disc type or the band type and a second one-way clutch F2 so that the sun gear 27 may be selectively fixed by those third brake B3 and second one-way clutch F2. Incidentally, this second one-way clutch F2 is applied, when the sun gear 27 rotates in the opposite direction of the ring gear 25, to stop the rotation of the sun gear 27.

As a result, the second speed change unit 12 is set to an under-drive state at a lower gear stage or a direct-connected state at a higher gear stage by applying the third clutch C3, the third brake B3 or the second one-way clutch F2.

To the end portion of the counter shaft 11 at the side of the counter driven gear 26, there is attached an output gear 28 which is in meshing engagement with the ring gear 30 of a front differential 29 or the final reduction gear mechanism.

The individual clutches C1, C2 and C3 and the individual brakes B1, B2 and B3 thus far described are frictional engagement elements to be activated by the oil pressure which is fed/drained by an oil pressure control system 31. This oil pressure control system 31 is constructed by solenoid valves to change the gear stages, to regulate the oil pressure during the speed change and to control the apply/release of the lockup clutch 8.

There is further provided an electronic control unit (T-ECU) 32 for executing the speed change and the pressure regulation by outputting signals to the individual solenoid valves in that oil pressure control system 31. This electronic control unit 32 is composed mainly of a central processing unit (CPU), a memory unit (RAM, ROM) and an input/output interface, and is fed for its control with a shift position signal, a pattern select switch signal, an overdrive switch signal, a manual shift switch signal, an output shaft RPM signal and a turbine RPM signal. Moreover, the electronic control unit 32 decides the gear stage on the basis of the input data and a map stored in advance and outputs an instruction signal to the oil pressure control system 31 on the basis of the decision result to regulate the shift and the regulated pressure at the shift time and to control the ON/OFF of the lockup clutch 8.

Figure 4:
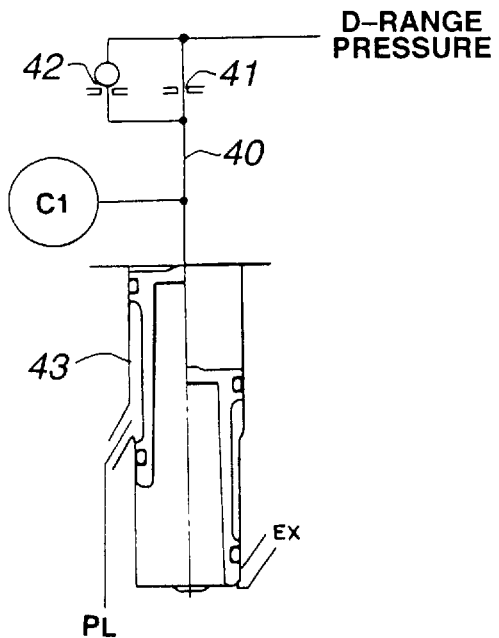
FIG. 4 is a diagram of a portion of a hydraulic circuit, as relating to a first clutch.

Here will be described the hydraulic circuit for controlling the apply/release of each of the frictional engagement elements. The first description will be made on the first clutch C1, which is always applied when a forward gear stage is to be set. As shown in FIG. 4 therefore, the first clutch C1 is connected via an oil passage 40 with the D-range port of the manual valve (although both are not shown). This D-range port is one for outputting the oil pressure even when any range for the forward run is selected, so that the oil pressure is fed to the first clutch C1 by selecting the forward running range. Moreover, the oil passage 40 is provided with an orifice 41 and an orifice 42 having a check ball in parallel, so that an accumulator 43 is connected by those orifices 41 and 42 with the side of the first clutch C1.

Figure 5:
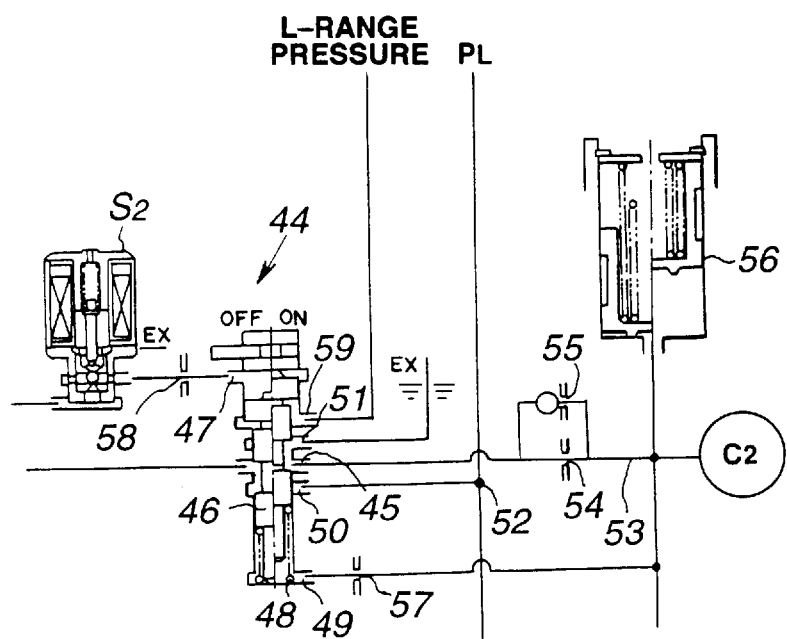
FIG. 5 is a diagram of a portion of the hydraulic circuit, as relating to a second clutch.

Here will be described the second clutch C2. As shown in FIG. 5 this second clutch C2 is connected with an output port 45 of the second clutch control valve 44. This second clutch control valve 44 is one for feeding/draining and regulating the oil pressure to and from the second clutch C2, and is constructed to change the oil passages by a spool 46 having three lands. Of these, the land, as formed at one end portion of the spool 46, is given a larger diameter than those of the remaining lands, and a control port 47 is formed to be opened in the end portion side of the diametrically large land. At the end portion opposed to the control port 47, there is arranged a spring 48 for urging the spool in the axial direction, and a feedback port 49 is opened in the portion where the spring 48 is arranged.

The output port 45 is formed in the axially intermediate portion, across which are formed an input port 50 and a drain port 51. More specifically, the input port 50 is formed closer to the feedback port 49 than the output port 45, and the drain port 51 is formed at the opposite side. The input port 50 is connected with a line pressure oil passage 52 so that it is fed with the initial pressure of the entirety of the oil pressure control system 31, that is, the line pressure PL which is regulated according to the throttle opening.

On the other hand, an oil passage 53 connecting the output port 45 and the second clutch C2 is provided with an orifice 54 and an orifice 55 having a check ball, which are arranged in parallel with each other. Moreover, a damper 56 is connected to the side closer to the second clutch C2 than those orifices 54 and 55, and the feedback port 49 is connected via an orifice 57 with the second clutch C2. Incidentally, the damper 56 is equipped with a spring-biased piston so that it absorbs the oil pressure when the piston retracts while compressing the spring, to level the oil pressure to be fed to the second clutch C2.

With the control port 47, there connected via an orifice 58 a second solenoid valve S2 for changing the output pressure. This second solenoid valve S2 is of the normally open type for outputting the signal pressure when OFF and is so duty-controlled that its output pressure lowers according to the increase in the duty ratio. Incidentally, reference numeral 59 designates an L-range port for feeding the L-range pressure which is outputted from the manual valve when the low range for setting a first speed for the engine braking effect is selected.

Specifically, the second clutch control valve 44 functions to balance the sum of the axial force of the spring 48 and the axial force, as based upon the output pressure acting upon the feedback port 49, with the axial force, as based upon the signal pressure of the second solenoid valve S2 acting upon the control port 47, so that the output pressure is so regulated as to rise with the rise in the signal pressure of the second solenoid valve S2. In the state where the signal pressure of the second solenoid valve S2 is at a considerable level, the spool 46 is held in the position, as shown at the lefthand half of FIG. 5 so that the line pressure is fed as it is to apply the second clutch C2 completely.

Figure 6:
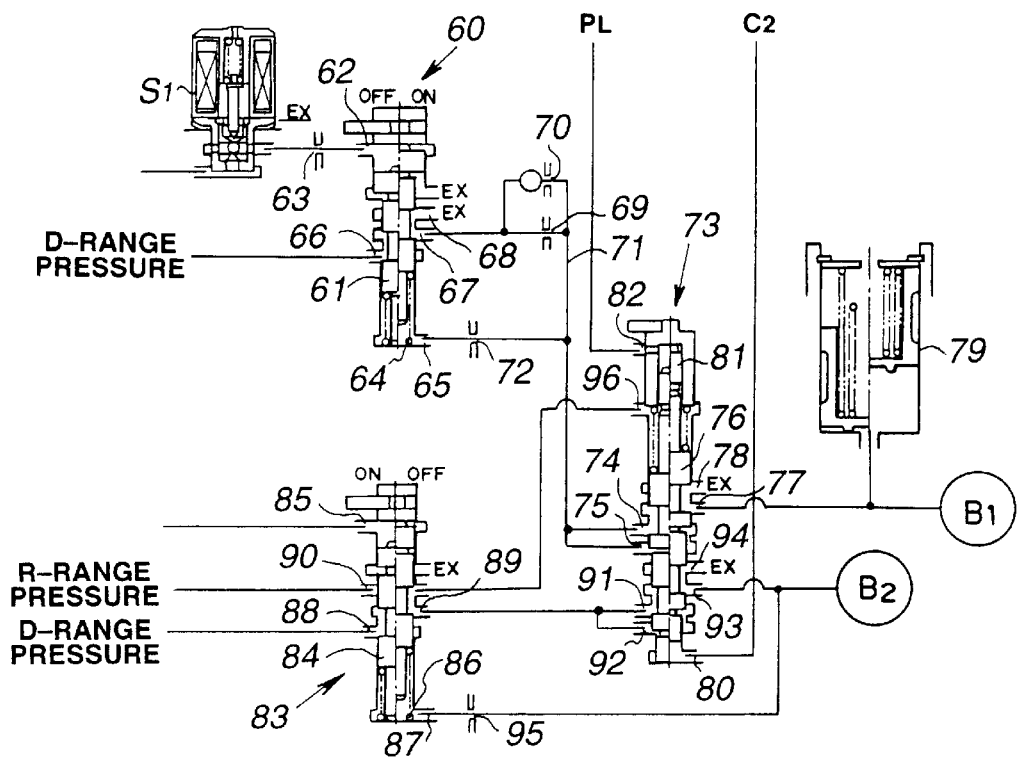
FIG. 6 is a diagram of a portion of the hydraulic circuit, as relating to a first brake and a second brake.

The hydraulic circuit for controlling the first brake B1 and the second brake B2 is shown in FIG. 6 A first brake control valve 60 for controlling the oil pressure of the first brake B1 is similar to the aforementioned second clutch control valve 44 and is equipped with a spool 61 having three lands, of which the land at one end portion is made diametrically larger than the remaining lands. At the side of this diametrically larger land, there is formed a control port 62 which is connected via an orifice 63 with a first solenoid valve S1 for outputting a signal pressure when OFF. This first solenoid valve S1 is so duty-controlled that its output pressure lowers as the duty ratio increases. At the side opposed to the diametrically larger land, there is arranged a spring 64 at the end portion where a feedback port 65 is formed.

In the axially intermediate portion of the first brake control valve 60, moreover, there are formed an input port 66, an output port 67 and a drain port 68 which are arranged sequentially in the recited order from the side (i.e., the lower side of FIG. 6) of the feedback port 65. Of these, the input port 66 is fed with the aforementioned D-range pressure, and the output port 67 is connected with an oil passage 71 which is provided with an orifice 69 and an orifice 70 having a check ball in parallel. With this oil passage 71, there is connected via an orifice 72 the aforementioned feedback port 65.

In this first brake control valve 60, therefore, the output pressure acts upon the feedback port 65, and the elastic force of the spring 64 acts together upward of FIG. 6. On the other hand, the axial force, as based upon the signal pressure of the first solenoid valve S1, acts downward of FIG. 6 so that the output pressure is regulated to balance those axial forces. When the signal pressure of the first solenoid valve S1 is higher a predetermined level, the spool 61 is held at the position, as shown at the lefthand half of FIG. 6 so that the D-range pressure is outputted as it is to the oil passage 71.

The oil passage 71, as connected with the output port 67 of the first brake control valve 60, is further connected with a first input port 74 of a fail-safe valve 73 and a first signal pressure port 75 adjacent to the former. This fail-safe valve 73 is equipped with a spool 76 having two diametrically larger lands, two diametrically intermediate lands and one diametrically smaller land. These lands are formed sequentially in the recited order downward of FIG. 6 and the first signal pressure port 75 is formed at a position to be opened between one diametrically larger land and the adjoining diametrically intermediate land. As a result, the oil pressure, as fed to the first signal pressure port 74, urges the spool 76 upward of FIG. 6.

Over the first input port 74, as seen from FIG. 6, there are sequentially formed a first output port 77 and a drain port 78 so that the first output port 77 is selectively connected with the first input port 74 and the drain port 78. The first brake B1 and a damper 79 are connected with that first output port 77.

At the end portion of the fail-safe valve 73 at the side of the diametrically smaller land of the spool 76, there is formed a control port 80 which is fed with the oil pressure of the second clutch C2. At the opposite end portion, on the other hand, there is arranged a plunger 81 which is formed at its end portion with a control port 82 fed with the line pressure PL.

Here will be described a second brake control valve 83 for controlling the second brake B2. This second brake control valve 83 is equipped with a spool 84 having three lands of the same diameters. At one end side of this spool 84, there is formed a control port 85 which is fed with the output signal pressure of the (not-shown) linear solenoid valve for the lockup clutch 8. At the opposite end portion of the control port 85, there is arranged a spring 86 at a portion where a feedback port 87 is opened.

At the axially intermediate portion of the second brake control valve 83, there are formed a D-range pressure input port 88, an output port 89 and an R-range pressure input port 90 sequentially from the side of the feedback port 87. Of these, the D-range pressure input port 88 is fed with the aforementioned D-range pressure, and the R-range pressure input port 90 is fed with the R-range pressure which is outputted from the manual valve when a reverse (R) range is selected.

The output port 89 of the second brake control valve 83 is connected with a second input port 91 and a second signal pressure port 92 in the aforementioned fail-safe valve 73. Of these, the second signal pressure port 92 is opened between the radially smaller land and the adjacent diametrically intermediate land so that the oil pressure acting upon the second signal pressure port 92 establishes an axial force for urging the spool 76 upward of FIG. 6. Between the second input port 91 and the aforementioned first signal pressure port 75, on the other hand, there are formed a second output port 93 and a drain port 94 sequentially in the recited order from the lower side of FIG. 6. Of these, the second output port 93 is connected with the second brake B2. In order to apply the oil pressure of the second brake B2 to the aforementioned feedback port 87, on the other hand, the second output port 93 is connected via an orifice 95 with the feedback port 87.

In the fail-safe port 73 between the spool 76 and the plunger 81, there is opened a third signal pressure port 96 which is connected with the aforementioned R-range pressure input port 90.

In the state where the spool 76 in the fail-safe valve 73 is pushed down to the position, as shown at the lefthand half of FIG. 6, therefore, the second input port 91 and the second output port 93 communicate with each other so that the oil pressure, as regulated by the second brake control valve 83, is fed to the second brake B2. In the second brake control valve 83, moreover, the second brake pressure or the output pressure acts upon the feedback port 87 so that a pressure regulating action like those of the second clutch control valve 44 and the first brake control valve 60 is caused to set the output pressure according to the pressure applied to the control port 85. When the oil pressure acting upon the control port 85 is higher than a predetermined level, the spool 84 is held in the position, as shown at the lefthand half of FIG. 6, so that the D-range pressure is outputted as it comes.

Figure 7:
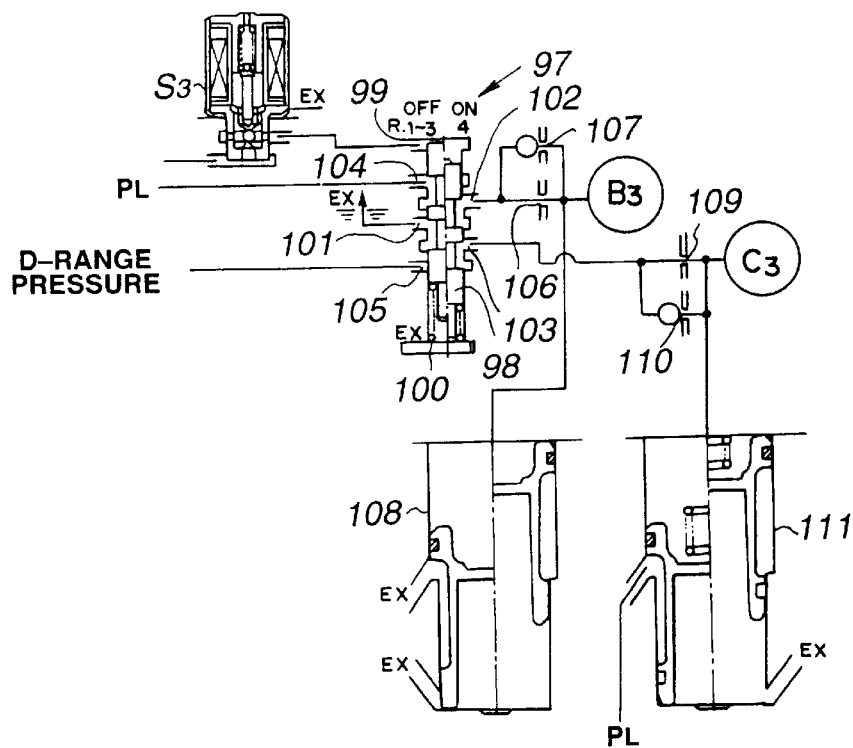
FIG. 7 is a diagram of a portion of the hydraulic circuit, as relating to a third clutch and a third brake.

FIG. 7 shows a hydraulic circuit for controlling the frictional engagement elements in the second speed change unit 12. The third clutch C3 and the third brake B3 in the second speed change unit 12 are constructed such that one is applied whereas the other is released. This is switched by a 3–4 shift valve 97 for changing the feed of the D-range pressure to the third clutch C3 and the feed of the line pressure PL to the third brake B3. Specifically, the 3–4 shift valve 97 is equipped with a spool 98 having three lands of the same diameters. At the side of one end portion of the spool 98, there is formed a control port 99 which is connected with a third solenoid valve S3. This third solenoid valve S3 is of the normally closed type ON/OFF valve which is duty-controlled to output the input pressure unchangedly as the signal pressure when ON or when the duty ratio is 100% and to reduce the output pressure as the duty ratio lowers. A spring 100 is arranged at the opposite end portion of the control port 99.

At the axially central portion of the 3–4 shift valve 97, there is formed a drain port 101, across which are formed a brake port 102 and a clutch port 103. Moreover, a line pressure input port 104 is formed at the opposite side of the drain port 101 across the brake port 102, and a D-range pressure input port 105 is formed at the opposite side of the drain port 101 across the clutch port 103. Specifically, when the spool 98 is pushed up to the position, as shown at the lefthand half of FIG. 7, the line pressure input port 104 communicates with the brake port 102, and the clutch port 103 communicates with the drain port 101. When the spool 98 is pushed down to the position, as shown at the righthand half of FIG. 7, the D-range pressure input port 105 communicates with the clutch port 103, and the brake port 102 communicates with the drain port 101.

With the brake port 102, moreover, there are connected the third brake B3 and an accumulator 108 via an orifice 106 and an orifice 107 having a check ball, as arranged in parallel with each other. With the clutch port 103, on the other hand, there are connected the third clutch C3 and an accumulator 111 via an orifice 109 and an orifice 110 having a check ball, as arranged in parallel with each other.

In the ordinary run with the D-range being selected in the automatic transmission 1 thus far described, the gear stages of the first speed to the fourth speed are set on the basis of the running state such as the vehicle speed and the throttle opening. FIG. 8 tabulates the applied/released states of the individual frictional engagement elements for the individual gear stages to be set in the D-range, together with the active states of the solenoid valves. In FIG. 8: symbols ○ indicate the ON state for the solenoid valves and the applied state for the frictional engagement elements; symbols X indicate the OFF state for the solenoid valves; symbols ⊙ indicate the applied state in the drive state; and blanks indicate the released state.

As seen from FIG. 8, a speed change between the second speed and the third speed or the fourth speed is made by switching the applied/released states of the second clutch C2 and the first brake B1. That is, the so-called "clutch-to-clutch shift" is achieved. In the usual operation, therefore, the first solenoid valve S1 is duty-controlled to regulate the oil pressure of the first brake B1, and simultaneously with this, the second solenoid valve S2 is duty-controlled to regulate the oil pressure of the second clutch C2 thereby to make controls to prevent the shock due to the tie-up of the frictional engagement elements and the overshoot of the engine.

The control of the clutch-to-clutch shift is achieved by controlling the oil pressures of the frictional engagement elements participating in the shift, directly by the solenoid valves, but is required to have an accuracy. When the oil temperature is low so that the oil viscosity is high or when the solenoid valves do not normally operate, the feed/drain of the oil pressures to/from the frictional engagement elements participating in the shift may not be normal to cause the shock or the engine overshoot. This is a problem intrinsic to the clutch-to-clutch shift. At this abnormal time, the control system according to the present invention thus far described keeps the running performance not by executing the clutch-to-clutch shift in the first speed change unit 10 but by causing the second speed change unit 12 to effectively operate.

Figure 1:
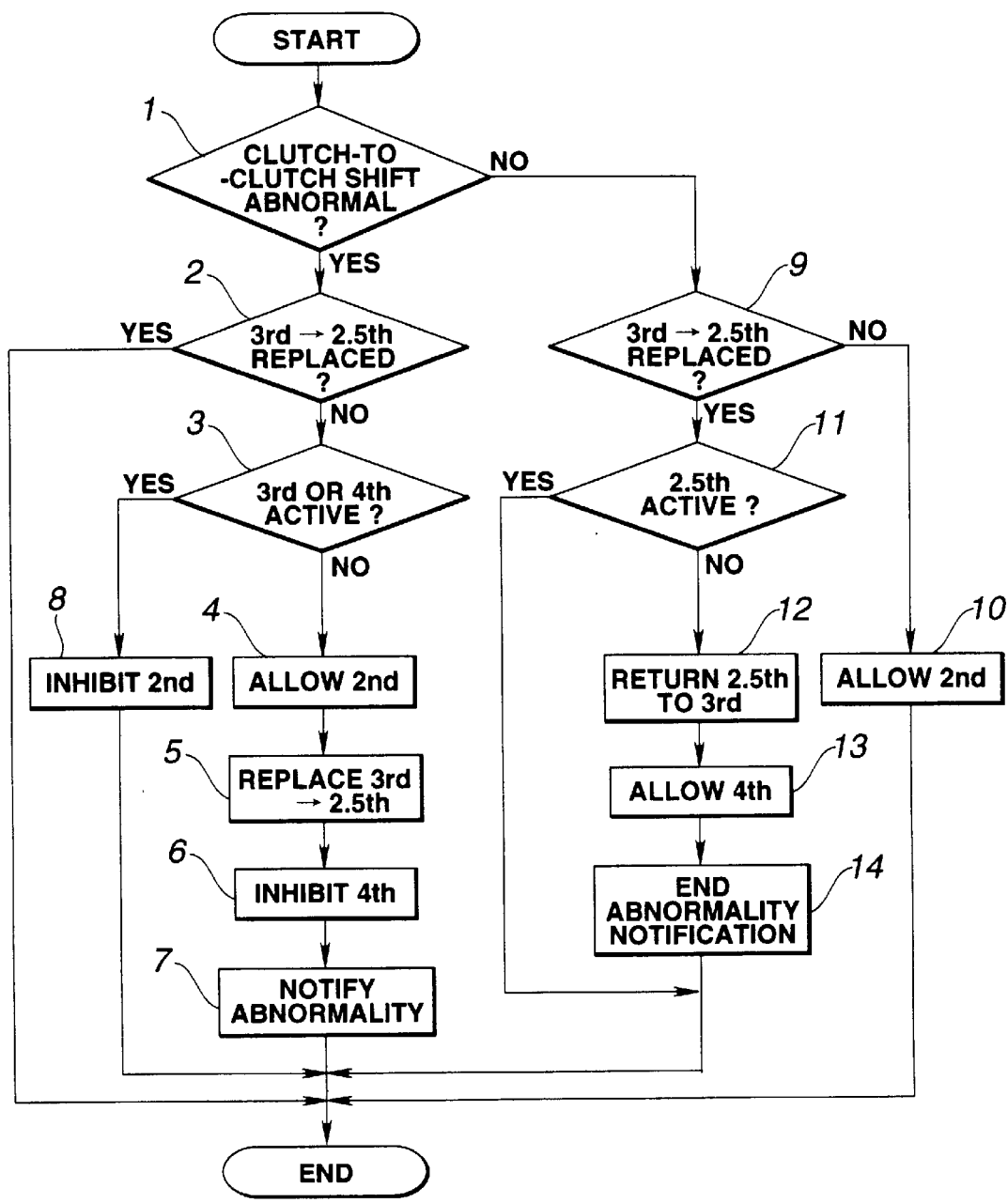
FIG. 1 is a flow chart for explaining one example of the control to be executed by a control system of the present invention when a clutch-to-clutch shift is abnormal.

FIG. 1 is flow chart showing a control routine for the running performance. After the processing of input signals by reading the data, it is decided (at Step 1) whether or not an abnormal state occurs for the clutch-to-clutch shift. This abnormal state cannot effect the clutch-to-clutch shift normally and is exemplified by the state, in which the clutch-to-clutch shift cannot be normally executed, by such a low oil temperature that the oil viscosity is so high as to influence the control, by the inactivity of the solenoid valves due to the disconnection or short-circuit for controlling the frictional engagement elements participating in the shift, by an abnormal output pressure of the solenoid valves for controlling the frictional engagement elements participating in the shift, and by the failure for the torque capacities of the frictional engagement elements to match the oil pressure. This abnormal state can be decided from the inconsistency between the control content and the execution content on the basis of the outputted control signals and the detection signals of the oil pressure and the RPM. Thus, the operation of Step 1 corresponds to shift abnormality detecting means of the present invention.

When the answer of Step 1 is YES because of an abnormality such as a low oil temperature, it is decided (at Step 2) whether or not the control to replace the 3rd speed by the 2.5th speed is being executed. This 2.5th speed is a gear stage for setting the first speed change unit 10 to the 2nd speed and for setting the second speed change unit 12 to a higher state (or directly connected stage), as tabulated in the application chart of FIG. 8, so that the gear ratio takes a value between the 2nd speed and the 3rd speed. Incidentally, the gear ratio of the 2.5th speed is desirably set to a value substantially equal to that of the 3rd speed. Moreover, the gear ratio of the 2.5th speed is set to a gear ratio between the 3rd speed and the 4th speed.

In view of the applied/released states of the frictional engagement elements, moreover, the 2nd speed is achieved by switching the applied/released states of the clutch C3 and the brake B3 of the second speed change unit 12 while leaving the first speed change unit 10 as it is. Especially in the second speed change unit 12, the 2nd speed is achieved by applying the third clutch C3 with the second one-way clutch F2 being applied in place of the third brake B3. Moreover, this replacement of the gear stage can be executed by changing the map stored in advance, for example.

When the 3rd speed is replaced by the 2.5th speed so that the answer of Step 2 is YES, the routine is returned without any control. When the answer is NO, on the other hand, it is decided (at Step 3) whether or not the active gear stage is at the 3rd or 4th speed. This decision can be made on the basis of the shift signal which is outputted from the electronic control unit 32. When the active gear stage is at the 3rd or 4th speed, the clutch-to-clutch shift occurs. Thus, the operation of Step 3 corresponds to the clutch-to-clutch shift deciding means of the present invention.

When the 3rd or 4th speed is not set so that the answer of Step 3 is NO, the 2nd speed is allowed (at Step 4), because the shift is not the clutch-to-clutch shift.

Moreover, the 3rd speed is replaced by the 2.5th speed (at Step 5), and the 4th speed is inhibited (at Step 6). This is to prevent the clutch-to-clutch shift because the 2nd speed is allowed. This replacement of the gear stage can be executed by changing the shift map, as described above, and the inhibition of the gear stage can be executed by changing the shift map or by stopping the output of the shift signal. Incidentally, the operation of Step 5 corresponds to shift instructing means.

When these replacement and inhibition of the gear stage are executed, the automatic transmission can set three forward speeds: the 1st speed (the gear ratio: 4.2); the 2nd speed (the gear ratio: 2.1); and the 2.5th speed (the gear ratio: 1.5). Moreover, the gear ratio of the 2.5th speed replacing the 3rd speed is approximate to that of the 3rd speed so that a smooth speed change can be executed. Since no clutch-to-clutch shift will naturally take place, the shift shock will hardly be deteriorated.

In the controls thus far described, the number of gear stages to be set is reduced, but the speed change is smoothly effected. This smoothness makes it difficult for the driver to perceive the abnormality, if any. When the control of Step 6 is executed, therefore, the abnormality is notified (at Step 7). This operation corresponds to notification means of the present invention and can adopt means for appealing to the eyes or ears of the driver by flashing or lighting a lamp or making a warning sound in the compartment. Another means to be adopted may deteriorate the shift shock worse than the ordinary one. When the back pressure of the accumulator 111 of the third clutch C3 to be applied at the 2.5th speed, for example, is made different from that at the ordinary shifting time, the application or release of the third clutch C3 is advanced or delayed, or the piston of the accumulator 111 has already been moved to the limit position in the course of the shift, so that the oil pressure of the third clutch C3 abruptly varies to increase the change in the output torque thereby to cause the shock. This vibration can be physically felt to notify the driver of the abnormality When the 3rd or 4th speed is set so that the answer of Step 3 isYES, on the other hand, the 2nd speed is inhibited (at Step 8). This is because the 3rd or 4th speed is kept till the 1st speed is decided, while avoiding the clutch-to-clutch shift. Thus, the operations of Step 6 and Step 8 correspond to first speed change unit shift inhibiting means of the present invention.

Here will be described the control for restoring the ordinary control from the aforementioned control at the abnormal time. When the answer of Step 1 is NO because of no abnormality, the routine advances to Step 9, at which it is decided whether or not the 3rd speed has been replaced by the 2.5th speed. When the answer of Step 9 is NO, the 2nd speed is allowed (at Step 10), and the routine is returned.

When the answer of Step 9 is YES so that the 3rd speed has been replaced by the 2.5th speed, on the other hand, it is decided (at Step 11) whether or not the active gear stage is set to the 2.5th speed. This decision can be made on the basis of the output signal of the electronic control unit 32. When the answer is YES, the routine is returned without any control. This is to prevent the shift which is not intended by the driver.

When the answer of Step 11 is NO, on the other hand, the 2.5th speed is returned to the 3rd speed (at Step 12), and the routine advances to Step 13, at which the 4th speed is allowed. The control of Step 12 can be executed by returning the shift map, as replaced at Step 5, to the original map, and the control of Step 13 can be executed by returning the shift map, as changed at Step 6, to the original map.

Then, the control to notify the abnormality is ended (at Step 14). This can be executed by stopping the lighting or flashing the lamp or the making of the warning sound, as executed at Step 7, or by returning the accumulator back pressure to the original pressure.

According to the controls described above, therefore, the clutch-to-clutch shift at the first speed change unit 10 is inhibited, when the situations do not allow the normal execution, so that the shift shock during the run can be prevented in advance from getting worse. In this case, moreover, the setting of the gear stage to the clutch-to-clutch shift is inhibited, but the shift in the second speed change unit 12 is executed to set a gear stage in place of the inhibited one. As a result, it is possible to prevent the reduction in the number of gear stages to be set and the increase in the gap (or difference) in the gear ratios, so that the running performance of the vehicle can be kept at a satisfactory level. Especially, the second speed change unit 12 is enabled to execute the shift by applying the one-way clutch F2 so that the shift control at the aforementioned abnormal time can be facilitated.

In the aforementioned controls, moreover, the smooth speed change can be performed to retain the running performance even when the clutch-to-clutch shift cannot be normally executed, so that the abnormality cannot be conceived from the running state. However, the control to notify the abnormality is executed so that counter-measures against the normality can be taken. This notification can be ensured by changing the oil pressure such as the accumulator back pressure to make the shock.

Incidentally, the automatic transmission to which is applied the present invention is equipped with the first speed change unit 10 for setting a plurality of gear stages including the reverse stage, and the second speed change unit 12 capable of controlling the speed change independently of the first speed change unit 10. At a normal time, moreover, the speed change to the 1st speed or the 3rd speed is executed at the first speed change unit 10, and the speed change between the 3rd speed and the 4th speed is executed by the second speed change unit 12. These shifts are executed to set the gear ratio to a desirable value, but the second speed change unit 12 can be used further positively at an abnormal time, as will be exemplified in the following.

Figure 2:
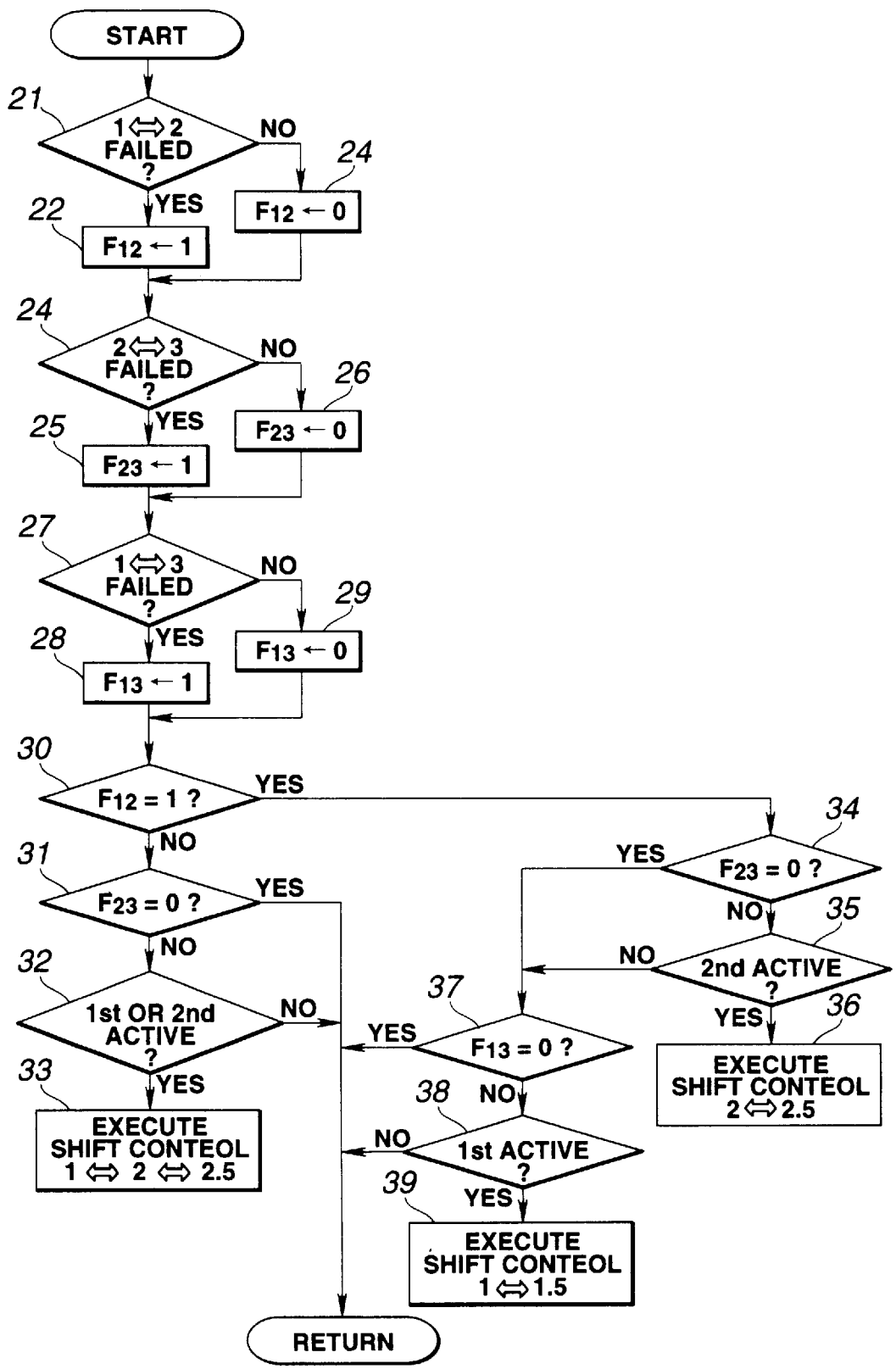
FIG. 2 is a flow chart for explaining one example of the control to be executed by using a second speed change unit in the control system of the present invention when the shift at a first speed change unit is abnormal.

When the setting of a gear stage in a shift, if abnormal, at the first speed change unit 10 is inhibited, not only the number of gear stages to be set is reduced, but also the gear stage at a lower speed is always set. In these cases, for example, the engine RPM may excessively rise. Therefore, the gear stage having a gear ratio approximate that of the inhibited gear stage is executed by the speed change at the second speed change unit 12. In FIG. 2, more specifically: the failure of the speed change between the 1st speed and the 2nd speed is decided (at Step 21); the failure of the speed change between the 2nd speed and the 3rd speed is decided (at Step 24); and the failure of the speed change between the 1st speed and the 3rd speed is decided (at Step 27). With these failures, flags F12, F23 and F13 corresponding thereto are set to "1" (at Steps 22, 25 and 28). Without any failure, on the other hand, the corresponding flags F12, F23 and F13 are set to "0" (at Steps 23, 26 and 29). Incidentally, the failures at any speed change includes all the states where the speed change cannot be normally executed, as including the state where the speed change cannot be executed because of an abnormality in the solenoid valves, control valves or shift valves, and the state where the oil pressure at the shifting time cannot be properly executed.

It is then decided (at Step 30) whether or not the flag F12 is at "1", that is, whether or not a failure of the speed change between the 1st speed and the 2nd speed is detected. When the speed change between the 1st speed and the 2nd speed is normally executed so that the answer of Step 30 is NO, it is decided (at Step 31) whether or not the flag F23 is at "0". That is, it is decided whether or not the speed change between the 2nd speed and the 3rd speed can be normally executed.

When the answer of Step 31 is NO, it means that there is an abnormality in the speed change between the 2nd speed and the 3rd speed of those which can be executed in the first speed change unit 10. In this case, therefore, it is decided (at Step 32) whether the active gear stage is at the 1st speed or at the 2nd speed. When either of these gear stages is set, the shift control is executed (at Step 33) by incorporating the three gear stages of the 1st, 2nd and 2.5th speeds into the forward gear stages.

This 2.5th speed is the gear state which is set by setting the first speed change unit 10 to the 2nd speed state and by setting the second speed change unit 12 to a higher stage (or the directly connected state) and which is set as a gear stage in place of the 3rd speed because the speed change from the 3rd speed to the 2nd speed is impossible. Even when the 3rd speed cannot be set, therefore, the automatic transmission can function substantially as the three-speed automatic transmission, and the 2.5th speed has a gear ratio approximate that of the 3rd speed so that the overrun of the engine can be prevented.

When the answer of Step 30 is YES because of a failure in the speed change between the 1st speed and the 2nd speed, it is decided (at Step 34) whether or not the speed change between the 2nd speed and the 3rd speed will be normally executed (that is, whether or not the flag F23 is at "0"). When the answer of this Step 34 is NO, both the speed change between the 1st speed and the 2nd speed and the speed change between the 2nd speed and the 3rd speed are abnormal. In this case, therefore, it is decided (at Step 35) whether or not the active gear stage is at the 2nd speed. When this answer is YES, the speed change between the 2nd speed and the 2.5th speed is executed (at Step 36) on the basis of the running state of the vehicle.

Specifically, when it is impossible to normally execute the speed change from the 2nd speed to the 1st speed and the speed change from the 2nd speed to the 3rd speed in the first speed change unit 10, it is made possible to set the 2.5th speed for the upshift of the second speed change unit 12. As a result, the gear stage is not limited to the 2nd speed but can be unsifted as the vehicle speed increases, to prevent the overrun of the engine.

When the answer of Step 34 is YES because the speed change between the 2nd speed and the 3rd speed is not abnormal, the routine advances to Step 37 at which it is decided whether or not the speed change between the 1st speed and the 3rd speed can be normally executed (that is, whether or not the flag F13 is at "0"). When this speed change is abnormal so that the answer of Step 37 is NO, what can be normally executed is the speed change between the 2nd speed and the 3rd speed of those to be executed at the first speed change unit 10. It is, therefore, decided (at Step 38) whether or not the active gear stage is at the 1st speed. When the 1st speed is set, the speed change between the 1st speed and the 1.5th speed is executed (at Step 39).

This 1.5th speed is the gear stage which is set by bringing the first speed change unit 10 into the stage of the 1st speed and the second speed change unit 12 into a higher stage (or the directly connected state). Even when the 1st speed is set while inhibiting an upshift from this 1st speed to the 2nd speed or the 3rd speed, the upshift to the 15th speed can be made to prevent the overrun of the engine. Thus, the operations of Steps 33, 36 and 39 correspond to speed change inhibiting means and alternative speed change instructing means of the present invention.

Incidentally, when any of the speed changes by the first speed change unit 10 can be normally executed so that the answers of Step 31 and Step 37 are YES, the routine is returned for another speed change. When the answer of Step 32 is NO because neither the 1st speed nor the 2nd speed is set in the state where the speed change between the 2nd speed and the 3rd speed cannot be executed, or when the answer of Step 38 is NO because a gear stage other than the 1st speed is set in the state where the speed change between the 2nd speed and the 3rd speed can be exclusively executed, the routine is returned for another shift control.

In the control shown in FIG. 2, therefore, a shift is executed, when the second speed change unit 12 can be unsifted although the first speed change unit 10 cannot be unsifted. In other words, the shift of the second speed change unit 12 is executed preferentially so that the entire gear ratio of the automatic transmission 1 can be reduced to prevent the overrun of the engine.

Incidentally, the present invention should not be limited to the specific embodiment thus far described but can be applied to a control system for an automatic transmission which is equipped with a gear train other than that shown in FIG. 3. Therefore, even when the clutch-to-clutch shift is other than that between the 2nd speed and a higher gear stage, the inhibition control and the replacement control of the gear stages can be made, as described above. Moreover, the second speed change unit should not be limited to that for the speed change between the two higher and lower stages but may make speed changes for more than two speeds. Still moreover, the present invention can be applied to a control system for an automatic transmission equipped with a hydraulic circuit other than that shown in FIGS. 4 to 7. In addition, the notification control in the present invention may notify the driver of an abnormality but should not be limited to the foregoing specific example.

Here will be synthetically described the advantages to be obtained from the present invention. According to the present invention, when the clutch-to-clutch shift, if cannot be executed, is inhibited in the first speed change unit, so that the shift shock due to the tie-up or the overshoot of the engine can be prevented in advance.

According to the present invention, moreover, an abnormal speed change is replaced by another to prevent the reduction in the number of gear stages to be set or the enlargement in the gap (or difference) between the gear ratios, so that the running performance can be retained while preventing the deterioration of the shift shock or the drop in the durability of the frictional engagement elements.

According to the present invention, still moreover, the driver can be notified of an abnormality even when the running performance at the abnormal time is kept, so that the continuation of the run in the abnormal state can be prevented in advance.

According to the present invention, furthermore, even when a predetermined speed change at the first speed change unit cannot be executed by a failure, a similar speed change is achieved as one at the second speed change unit so that the running performance at the abnormal time can be retained.

What is claimed is:

1. A control system for an automatic transmission which includes a first speed change unit for executing a predetermined speed change by applying/releasing two of a plurality of independently engagable frictional engagement elements simultaneously and a second speed change unit capable of executing speed changes in at least two higher and lower stages are connected in tandem, comprising:

speed change abnormality detecting means for detecting an abnormality in the speed change which is executed by applying/releasing the two frictional engagement elements of said first speed change unit simultaneously; and first speed change unit speed change inhibiting means for inhibiting the speed change, which is executed by applying/releasing said two frictional engagement elements in said first speed change unit, when said speed change abnormality is detected by said speed change abnormality detecting means.

2. A control system according to claim 1, further comprising:

clutch-to-clutch shift deciding means for deciding that said shift is to be executed by applying/releasing said two frictional engagement elements in said first speed change unit; and speed change instructing means for executing a speed change other than that, which is decided by said clutch-to-clutch shift deciding means, when said speed change abnormality detecting means detects said speed change abnormality.

3. A control system according to claim 2, wherein said speed change instructing means includes means for instructing the gear stage which is achieved exclusively by the speed change of said second speed change unit.

4. A control system according to claim 2, wherein said second speed change unit includes a one-way clutch for setting a higher gear stage or a lower gear stage, and wherein said speed change instructing means includes means for instructing a gear stage to be set by applying said one-way clutch.

5. A control system according to claim 1, further comprising:

notification means for notifying an inhibition of a predetermined speed change in said first speed change unit when said predetermined speed change is inhibited by said first speed change unit speed change inhibiting means.

6. A control system according to claim 2, further comprising:

notification means for notifying an inhibition of a predetermined speed change in said first speed change unit when said predetermined speed change is inhibited by said first speed change unit speed change inhibiting means.

7. A control system according to claim 1, wherein said abnormality detecting means includes means for any of a lower oil temperature than a preset level, an electric abnormality of a solenoid valve, an abnormality in the output pressure of the solenoid valve, or an abnormality in the torque capacities of said frictional engagement elements.

* * * * *